(12) United States Patent
Cartwright

(10) Patent No.: US 11,643,217 B2
(45) Date of Patent: May 9, 2023

(54) AIRCRAFT ELECTRICAL POWER DISTRIBUTION

(71) Applicant: ROLLS-ROYCE plc, London (GB)

(72) Inventor: Matthew S. Cartwright, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/320,299

(22) Filed: May 14, 2021

(65) Prior Publication Data

US 2021/0371116 A1    Dec. 2, 2021

(30) Foreign Application Priority Data

May 29, 2020   (GB) ..................................... 2008070

(51) Int. Cl.
*B64D 27/24* (2006.01)
*B64D 27/10* (2006.01)
*B60L 50/60* (2019.01)
*H02J 4/00* (2006.01)

(52) U.S. Cl.
CPC .............. *B64D 27/24* (2013.01); *B60L 50/60* (2019.02); *B64D 27/10* (2013.01); *H02J 4/00* (2013.01); *B60L 2200/10* (2013.01); *B64D 2221/00* (2013.01)

(58) Field of Classification Search
None
See application file for complete search history.

(56) References Cited

U.S. PATENT DOCUMENTS

| 3,311,691 | A1 | 11/2012 | Matsumoto |
| 2016/0211767 | A1 | 7/2016 | Hotta |
| 2021/0147092 | A1* | 5/2021 | Brown .................. B64D 31/06 |

FOREIGN PATENT DOCUMENTS

| EP | 3392148 A1 | 10/2018 |
| RU | 2614388 C2 | 3/2017 |
| WO | 9315311 A1 | 8/1993 |

OTHER PUBLICATIONS

Great Britain search report dated Feb. 17, 2021, issued in GB Patent Application No. 2008070.1.
European search report dated Sep. 21, 2021, issued in EP Patent Application No. 21171080.

* cited by examiner

*Primary Examiner* — Daniel Kessie
*Assistant Examiner* — Terrence R Willoughby
(74) *Attorney, Agent, or Firm* — Shumaker & Sieffert, P.A.

(57) ABSTRACT

A method of operating an aircraft electrical power distribution system comprises determining a measure of ambient pressure; and setting a target operating voltage in accordance with the measure of ambient pressure. The method further comprises controlling the operating voltage in accordance with the set target operating voltage. The target operating voltage may refer to a distribution voltage of the aircraft. An aircraft electrical power distribution system is also disclosed, comprising: a sensor configured to determine a measure of ambient pressure; a controller configured to set a target operating voltage in accordance with the measure of ambient pressure, and a voltage regulator configured to regulate the operating voltage in accordance with the set target value.

19 Claims, 5 Drawing Sheets

AIRCRAFT ELECTRICAL POWER DISTRIBUTION

CROSS-REFERENCE TO RELATED APPLICATIONS

This specification is based upon and claims the benefit of priority from United Kingdom Patent Application No. 2008070.1, filed on 29 May 2020, the entire contents of which are incorporated herein by reference.

BACKGROUND

Technical Field

The present disclosure relates to an electrical power distribution system and a method of operating such an aircraft electrical power distribution on an aircraft, and also to a propulsion system for an aircraft and to a method of operating such a propulsion system. The propulsion system may be a fully electric propulsion system for a pure-electric aircraft or a hybrid system (e.g. a series hybrid system) for a hybrid-electric aircraft. The system and method may also be used on a "more electric" aircraft, whether or not the electrical power provides propulsion (e.g. in a parallel hybrid system).

Description of the Related Art

In hybrid systems, the aircraft propulsion is at least partially electrical instead of being entirely provided mechanically by a gas turbine engine or the likes. One or more gas turbine engines may still be present as part of a hybrid system. A variety of hybrid propulsion systems are known and have been proposed for aircraft, including both series and parallel hybrid aircraft. Parallel hybrid aircraft have been proposed, in which an internal combustion engine is combined with one or more electric motors to drive one or more propulsors. Parallel hybrid systems can be distinguished from so-called "serial hybrid" systems, in that in a parallel hybrid system, a mechanical connection is provided by the internal combustion engine and at least one propulsor, with at least one electric motor driving either the same propulsor as that driven by the internal combustion engine, or a further propulsor.

"More electric" aircraft are aircraft in which more on-board systems are powered by electricity stored or generated on board, with the use of hydraulic and pneumatic power gradually being replaced by electricity. The actual propulsion of the aircraft may still be fully provided mechanically by a gas turbine engine or the likes in a more electric aircraft.

SUMMARY

According to a first aspect there is provided a method of operating an aircraft electrical power distribution system having an operating voltage, the method comprising: determining a measure of ambient pressure; setting a target operating voltage of the aircraft electrical power distribution system in accordance with the measure of ambient pressure; and controlling the operating voltage in accordance with the set target operating voltage.

Due to the relationship between pressure and altitude, an altitude value may be taken to provide a measure of ambient pressure.

In particular, the target operating voltage may be reduced as pressure decreases (e.g. due to aircraft altitude increasing). As electrical breakdown voltage generally decreases as pressure reduces, adjusting the voltage in this way may reduce the risk of arcing. Correspondingly, the target operating voltage may be increased as pressure increases (e.g. due to aircraft altitude decreasing).

Traditionally, operating voltages on an aircraft are set to be constant and low enough to be safe under the lowest pressure/highest altitude conditions. The method of the first aspect may therefore allow higher voltages to be used during normal operation, or during lower altitude operation, with the voltage then being decreased if pressure falls. The use of higher voltages may reduce the transmission current (for the same power), thus reducing losses. In particular, power loss in the form of heat is generally proportional to current squared, as well as to resistance, and may be referred to as $I^2R$ losses. In some embodiments, the method of the first aspect may therefore reduce the thermal management burden for some components, as less waste heat may be generated due to the reduced current.

In various embodiments, aircraft and/or propulsion system components already present in known aircraft may be used to implement the method of the first aspect—no new or additional components may be needed, and therefore no additional mass may be needed to implement the method. In particular, existing sensing, processing, and/or control hardware may be used.

The method of the first aspect may be implemented to power one or more propulsors of an aircraft—each propulsor may be a driven fan or open rotor. The method may be implemented in an all-electric aircraft, or a hybrid electric aircraft. Further, the method may be implemented for one or more systems of a more-electric aircraft, even if a traditional gas turbine engine is the only propulsive power. Embodiments may be of utility for any aircraft with a high voltage system, whatever the purpose of that system. For example, embodiments may be of particular utility for systems with a voltage near, equal to, or greater than Paschen's minima. In particular, embodiments may be of particular utility for systems with a voltage of over 270 V, optionally over 300 V, and further optionally of 327 V or more (327 V being the Pachen's minimum for air at a pressure of one atmosphere and an electrode/conductor spacing of 7.5 µm). In some embodiments, an aircraft may use a voltage of e.g. ±300 Vdc, implementing of a 0 V conductor such that neither the positive or the negative pole sees a potential difference of more than 300 V.

The measure of ambient pressure may be or comprise an altitude value obtained from an altimeter, for example from an altimeter of an aircraft on board which the method is implemented.

The measure of ambient pressure may be or comprise a pressure value obtained from a pressure sensor, for example from a pressure sensor of an aircraft on board which the method is implemented.

One or more sensors, of one or more different types, may be used in conjunction to provide a more reliable measure of ambient pressure.

The control of the operating voltage may comprise controlling a power source so as to provide power at, or near to, the set target operating voltage. The power generation itself may therefore be regulated and adjusted as appropriate. Voltage regulation is generally achieved by controlling the sourcing and/or sinking of current/power into a distribution system (to match utilisation). Over-sourcing of current generally results in a raised system voltage—conversely, under-supply (or too much utilisation) generally results in lowered system voltage.

The controlling the operating voltage may comprise a voltage regulator stepping up or stepping down the voltage of pre-sourced power to the set target operating voltage value. The power generation itself may be at a constant voltage. The skilled person would appreciate that a battery directly connected to the distribution system may be problematic in various embodiments as the distribution voltage is being varied based on environmental conditions (not power management needs), so the battery may discharge most at high altitude, and charge at low altitude. An intervening controller, between the battery and the distribution system, may therefore be provided. Power sources may therefore each be provided with variable control of voltage regulation.

In some embodiments, the controlling the operating voltage may comprise actions performed by both the power source and the voltage regulator.

The method may further comprise distributing power to one or more consumers (e.g. electrical machines) on the aircraft, at the target operating voltage. The target operating voltage may therefore be a target distribution voltage.

In the art, "consumers" is used as a catch-all term for anything that uses/consumes electrical energy. Motors are a type of consumer, but it will be appreciated that an aircraft generally has many consumers of various types (e.g. avionics, computers, anti-ice heaters, etc.). The power may therefore be delivered to any one or more electrically powered systems on the aircraft by the distribution system, so satisfying electrical loads on the aircraft. Multiple separate distribution systems may be used in some embodiments—for example for different sub-sets of consumers, and/or to provide redundancy in case of failure.

It will be appreciated that an electrical system on an aircraft may generally comprise a number of systems operating at different voltages, and that aspects of the invention may be applied to the higher voltage systems only (in particular, those near to or exceeding Paschen's minima) in some embodiments.

The target operating voltage may be seen as a target value—in reality, the controlled voltage may fluctuate around this value.

The setting of a target operating voltage in accordance with the measure of ambient pressure may comprise: (i) continuously decreasing the target operating voltage when ambient pressure is decreasing; (ii) continuously increasing the target operating voltage when ambient pressure is increasing; and (iii) maintaining the target operating voltage at a constant level when ambient pressure is constant.

The increases and decreases in target operating voltage may be limited by bounds of a flight envelope—the flight envelope may relate to expected minimum and maximum altitudes/pressures, and may be used to set upper and lower bounds on the voltage beyond which it would not be increased or decreased, respectively. The continuous changing with ambient pressure may therefore only be performed within bounds based on a flight envelope (e.g. between set maximum and minimum pressures or altitudes), and/or on bounds based on component power requirements and voltage and/or insulation ratings.

The setting of a target operational voltage in accordance with the measure of ambient pressure may comprise: (i) pre-defining a plurality of pressure levels; (ii) stepping down the voltage to a pre-set level of a plurality of pre-set voltage levels if the measure of ambient pressure decreases towards or past a value corresponding to one of the set levels; and (ii) stepping up the voltage to a pre-set level of a plurality of pre-set voltage levels if the measure of ambient pressure increases towards or past a value corresponding to one of the set levels.

The setting of a target operational voltage in accordance with the measure of ambient pressure may comprise: (i) pre-defining a plurality of set altitude levels; (ii) stepping up the voltage to a pre-set level of a plurality of pre-set voltage levels if the measure of altitude decreases towards or past a value corresponding to one of the set levels; and (ii) stepping down the voltage to a pre-set level of a plurality of pre-set voltage levels if the measure of altitude increases towards or past a value corresponding to one of the set levels.

Hysteresis bands may be defined around the set altitude levels or set pressure levels.

When hysteresis bands are defined around the set pressure levels, the stepping down of voltage may be performed when the measure of ambient pressure reaches the hysteresis band below the set pressure level, and the stepping up of voltage may be performed when the measure of ambient pressure reaches the hysteresis band above the set pressure level (or vice versa in terms of which change is associated with which band in other embodiments). When hysteresis bands are defined around the set altitude levels, the stepping down of voltage may be performed when the measure of altitude reaches the hysteresis band above the set altitude level, and the stepping down of voltage may be performed when the measure of altitude reaches the hysteresis band below the set altitude level (or vice versa in terms of which change is associated with which band in other embodiments).

The spacing in altitude/pressure of the step up and the step down (as compared to doing either when the same altitude or pressure value is approached from the appropriate direction) may reduce or avoid oscillation when the aircraft is at an altitude/has an ambient pressure near or equal to the set level.

According to a second aspect, there is provided a propulsion system for an aircraft. The propulsion system comprises: a fan comprising a plurality of fan blades; a power source for supplying power to drive the fan.

The propulsion system also comprises an electrical power distribution system comprising: a sensor arranged to determine a measure of ambient pressure; a controller arranged to set a target operating voltage of the aircraft electrical power distribution system in accordance with the measure of ambient pressure; and a voltage regulator arranged to regulate the operating voltage of the electrical power distribution system in accordance with the set target operating voltage.

The electrical power distribution system may be arranged to distribute power from the power source listed above, and/or from one or more different power sources. The electrical power distribution system does not necessarily distribute power for use in propulsion. Various embodiments of the invention may therefore relate to fully-electric aircraft, in which the only power sources are providers of electricity such as batteries. The propulsion may therefore be fully electric.

Various embodiments of the invention may therefore relate to hybrid-electric aircraft, in which the propulsion is partially electric (e.g. with an electric motor supplementing torque provided mechanically by a gas turbine engine).

Other embodiments may relate to more electric aircraft—MEAs. MEAs may include embodiments both with and without partially electrically powered propulsion. Electrical power may partially power propulsion, and/or may be used to power other systems (e.g. air conditioning, heating, lighting, and/or in-flight entertainment, amongst other examples). In some MEA embodiments, all propulsion is provided mechanically.

In some embodiments, the power source may be a gas turbine which is arranged to drive the fan directly and also to act as a generator, supplying some electrical power to the electrical distribution system.

In various embodiments, the power source may be or comprise one or more of the following: a gas turbine engine, a battery, a capacitor, and/or a generator.

In some embodiments, the power source which drives the fan is not electrical and is not electrically connected to the electrical power distribution system. The electrical power distribution system may distribute power from a different power source—e.g. a battery. The aircraft may therefore have multiple power sources, one or more of which may not be connected to the electrical power distribution system.

The propulsion system may further comprise an electrical motor arranged to be powered by the power source and to drive the fan via the gearbox. The input from the power source to the gearbox is therefore provided via the motor in such embodiments. The electrical power distribution system may be arranged to supply electrical energy to the electrical motor (optionally amongst other electric machines and/or other consumers).

In alternative or additional embodiments, the electrical power distribution system may be used to power auxiliary systems of the propulsion system (e.g. a fuel pump or cooling system) instead of, or as well as, to provide propulsive power.

According to a third aspect, there is provided a propulsion system for an aircraft. The propulsion system comprises: a fan comprising a plurality of fan blades; an electrical motor for driving the fan; and an electrical power distribution system for supplying electrical energy to the electrical motor, the electrical power distribution system comprising: a sensor arranged to determine a measure of ambient pressure; one or more power sources; one or more controllers arranged to set a target operating voltage in accordance with the measure of ambient pressure; and one or more voltage regulators arranged to regulate the operating voltage of the electrical power distribution system in accordance with the set target operating voltage.

The voltage regulator of the second and/or third aspect may be arranged to regulate/adjust the voltage output from the power source. The voltage of the electrical power distribution system regulated by the one or more voltage regulators may therefore be the distribution voltage of the electrical power distribution system. The voltage regulator may condition the output from the power source. The power source output voltage itself may or may not be variable, in different implementations—provided that the source can provide sufficient voltage to deliver the maximum distribution voltage, a regulator may adjust a constant source voltage as appropriate. By contrast, in other implementations some or all of the adjustment may be done by the power source itself—the power source may be described as having an integrated voltage regulator in such embodiments.

The propulsion system of the second or third aspect may be used to implement the method of the first aspect.

The power source of the second or third aspect may be or comprise a chemical battery.

The power source of the second or third aspect may be or comprise a gas turbine engine and an electrical generator arranged to be driven by the gas turbine engine.

The one or more voltage regulators may be a part of the power source(s) in such embodiments—a power source may be designed to regulate its own output voltage to provide the desired variable operating voltage.

More than one power source may be provided. In embodiment with multiple power sources, each power source which produces electrical power may have a dedicated voltage regulator, operating to the same target operating voltage. The regulator may be integral with, or connected to, the respective power source.

The controller of the second or third aspect may be arranged to implement the method as described with respect to the first aspect.

According to a fourth aspect, there is provided an aircraft electrical power distribution system comprising: a sensor arranged to determine a measure of ambient pressure; a controller arranged to set a target operating voltage of the aircraft electrical power distribution system in accordance with the measure of ambient pressure; and a voltage regulator arranged to regulate the operating voltage of the electrical power distribution system in accordance with the set target operating voltage.

More specifically, the voltage regulator may be arranged to regulate the power output from a power source (i.e. adjusting the voltage) to achieve the target operating voltage.

The aircraft electrical power distribution system may further comprise a motor, for example a motor for driving a propulsor of an aircraft.

The motor may be arranged to drive a propulsor of an aircraft.

The motor may be arranged to drive the propulsor of the aircraft via a reduction gearbox.

The aircraft electrical power distribution system of this fourth aspect may form a part of the propulsion system of the second or third aspect.

The power source may be or comprise either or both of: (i) a chemical battery; and (ii) a gas turbine engine and an electrical generator arranged to be driven by the gas turbine engine.

The controller of the aircraft electrical power distribution system of this third aspect may be arranged to implement the method of the first aspect.

The skilled person would appreciate that the control methodology, electrical distribution system and propulsion system described herein could be used in different fields, for example outside of aerospace, in any application in which altitude and/or pressure is expected to vary significantly.

According to further aspects, the control methodology, electrical distribution system, and/or propulsion system described herein may be used in transport or industrial applications such as for mountain quarry trucks, and portable electrical power generators.

As used herein, cruise conditions have the conventional meaning and would be readily understood by the skilled person. Thus, for a given propulsion system for an aircraft, the skilled person would immediately recognise cruise conditions to mean the operating point of the propulsion system at mid-cruise of a given mission (which may be referred to in the industry as the "economic mission") of an aircraft using the propulsion system. In this regard, mid-cruise is the point in an aircraft flight cycle at which 50% of the total stored energy for flight (e.g. fuel, chemical energy storage for batteries, and/or the likes) between top of climb and start of descent has been used (which may be approximated by the midpoint—in terms of time and/or distance-between top of climb and start of descent). Cruise conditions thus define an operating point of the propulsion system that provides a thrust that would ensure steady state operation (i.e. maintaining a constant altitude and constant Mach Number) at mid-cruise of an aircraft using the propulsion system, taking into account the number of propulsion systems provided to that aircraft. For example where a propulsion system is designed to be attached to an aircraft that has two propulsion systems of the same type, at cruise conditions each propulsion system may provide half of the total thrust that would be required for steady state operation of that aircraft at mid-cruise.

In other words, for a given propulsion system for an aircraft, cruise conditions are defined as the operating point of the propulsion system that provides a specified thrust (required to provide—in combination with any other propulsion systems on the aircraft—steady state operation of the aircraft using the propulsion system at a given mid-cruise Mach Number) at the mid-cruise atmospheric conditions (defined by the International Standard Atmosphere according to ISO 2533 at the mid-cruise altitude). For any given propulsion system for an aircraft, the mid-cruise thrust, atmospheric conditions and Mach Number are known, and thus the operating point of the propulsion system at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the propulsion system that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the propulsion system that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a propulsion system described and/or claimed herein may operate at the cruise conditions defined elsewhere herein. Such cruise conditions may be determined by the cruise conditions (for example the mid-cruise conditions) of an aircraft to which at least one (or more, for example 2 or 4) propulsion systems may be mounted in order to provide propulsive thrust.

The propulsion system and electrical power distribution system described and/or claimed herein may also influence ground-based operation. It will be appreciated that there are significant altitude differences between airports—ranging from sea level (or indeed below sea level for airfields such as the Bar Yehuda airfield in Israel) to high altitudes in mountainous areas (e.g. the El Alto International Airport in Bolivia). An electrical power distribution system as described herein may therefore also be used to regulate the operating voltage when taxiing, or during other ground-based operations, landing and take-off. The control methodology described herein may therefore be useful not only at cruise, but throughout an aircraft's operation.

According to an aspect, there is provided an aircraft comprising a propulsion system as described and/or claimed herein. The aircraft according to this aspect is the aircraft with which the propulsion system is to be used. Accordingly, the cruise conditions according to this aspect correspond to the mid-cruise of the aircraft, as defined elsewhere herein.

According to an aspect, there is provided a method of operating a propulsion system as described and/or claimed herein. The operation may be at the cruise conditions as defined elsewhere herein (for example in terms of the thrust, atmospheric conditions and Mach Number), under conditions for ground-based, and/or all aircraft operation.

According to an aspect, there is provided a method of operating an aircraft comprising a propulsion system as described and/or claimed herein. The operation according to this aspect may include (or may be) operation at the mid-cruise of the aircraft, as defined elsewhere herein, and/or operation under any or all other suitable conditions.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
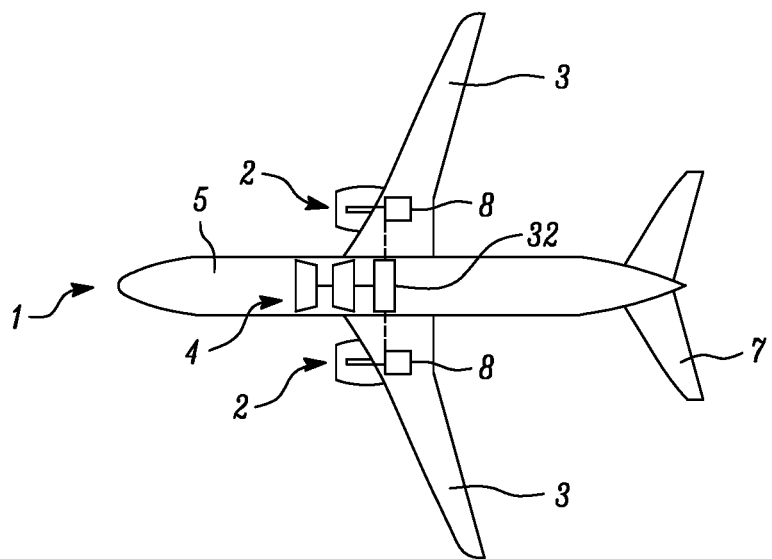
FIG. 1 is a schematic plan view of an aircraft with a propulsion system.
Figure 2:
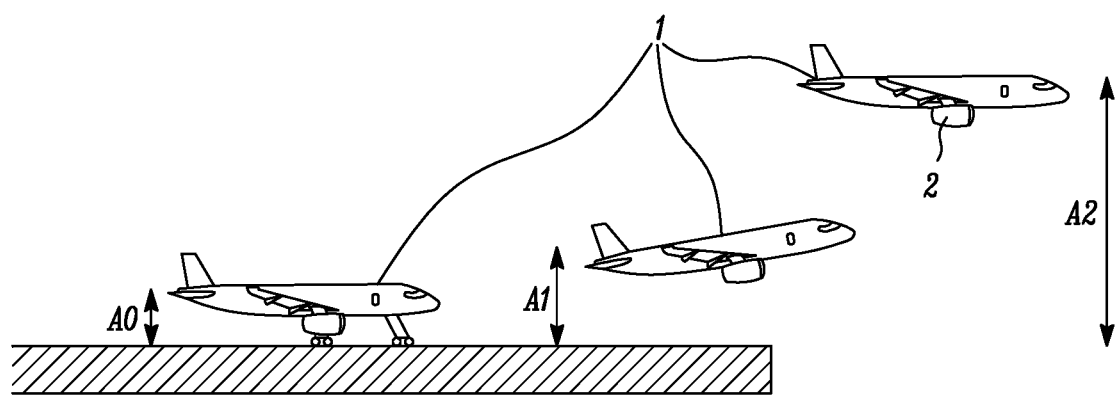
FIG. 2 is a schematic side view of an aircraft at three different altitudes.

With reference to FIG. 1, an aircraft 1 is shown having a propulsion system 2. The aircraft 1 is of a conventional configuration, having a fuselage 5, wings 3, tail 7 and a pair of propulsion systems 2. One of the propulsion systems 2 is shown in more detail in FIG. 5. The aircraft 1 is arranged to operate at various altitudes—for example, as shown in FIG. 2, at ground level (A0) during taxiing (landing gear 9 shown schematically), take-off and landing, at a variety of intermediate altitudes (A1) during climb and landing, and at a cruise altitude (A2) during cruise. The cruise altitude A2 may vary for different aircraft 1 and for different operations of the same aircraft (e.g. an increase in altitude to travel over a mountainous region). For example, cruise altitude may be in the range from 10000 m to 15000 m. In addition, whilst ground altitude A0 may be sea level (or indeed lower) for some airports or airfields, ground altitude may be much higher—for example at an elevation of over 4,400 m for Daocheng Yading Airport in China, and of around 4,060 m for El Alto International Airport in Bolivia.

In various embodiments, the operating voltage arranged to be varied with altitude/pressure may reduce between the lowest altitude operation and the highest altitude operation by over 10%, optionally over 15%, further optionally over 20%, 25%, 30%, 35%, 40% or 50%. The reduction may be by a proportion in the range from 5% to 85%, or from 10% to 75%, and optionally from 20% to 50%.

It will be clear to a skilled person that the voltage reduction for a given mission and aircraft may be selected as a design trade influenced by the magnitude of electrical power demand at altitude. For example, where a mission and aircraft require only 10% of nominal electrical power at mid-cruise altitude, the voltage reduction may be much greater without requiring additional current-carrying capacity (and therefore added mass) in the distribution system. In various embodiments, the reduction in voltage as disclosed herein may have a primary aim of increasing or maximising the insulation margin, and therefore the amount of voltage reduction desired may be dependent on the nominal voltage selection during system design.

The propulsion system 2 is arranged to be capable of supplying propulsive power to the aircraft 1 at any altitude likely to be encountered in operation. Atmospheric pressure decreases as altitude increases. To reduce or avoid a requirement to pressurise non-occupied parts of the aircraft 1, the propulsion system 2 may be arranged to be capable of supplying propulsive power to the aircraft 1 at any ambient pressure likely to be encountered in operation. The skilled person would appreciate that air pressure within the aircraft 1, even outside of a cabin thereof, may remain higher than ambient pressure whilst still dropping with ambient pressure in various embodiments.

Figure 3:
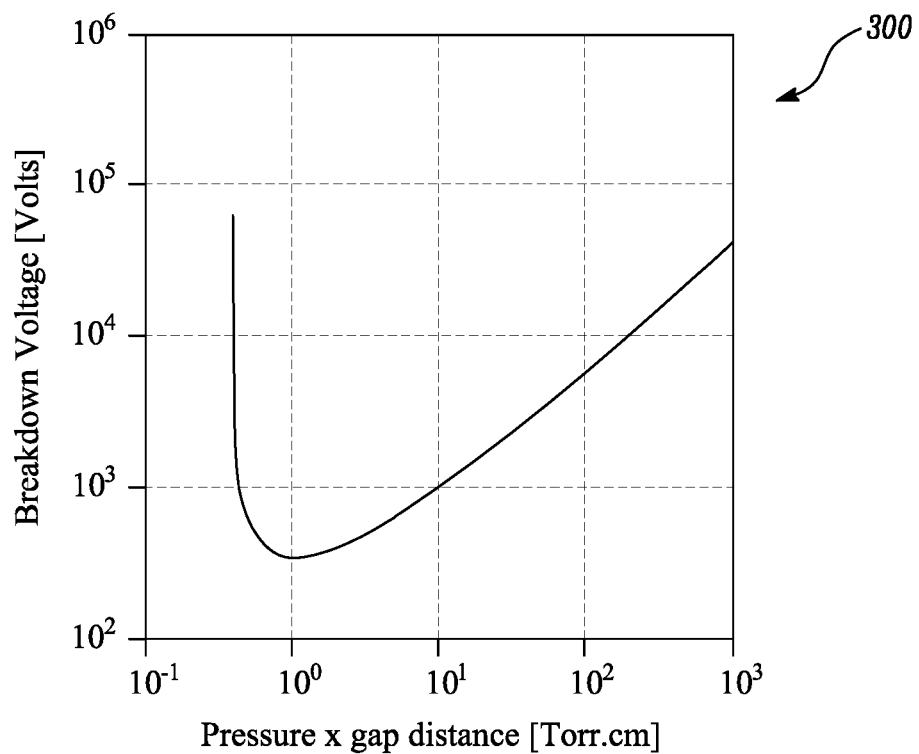
FIG. 3 is a Paschen curve illustrating a standard relationship between breakdown voltage and pressure.
Figure 4:
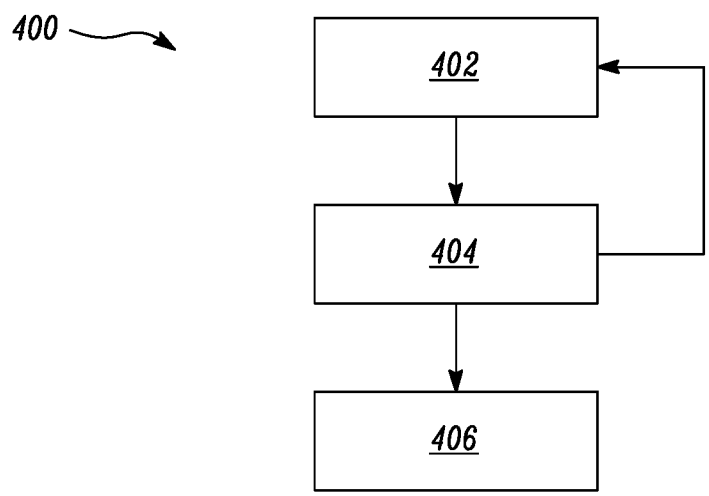
FIG. 4 illustrates a method of operating an aircraft electrical power distribution system.

Electrical breakdown voltage generally decreases as pressure reduces, so making arcing (which may cause a short-circuit or other deleterious effects) more likely as altitude increases, before increasing again at very low pressures. A Paschen curve 300 for air is shown in FIG. 3 by way of example. The graph 300 shows breakdown voltage (y-axis), in volts, plotted against pressure multiplied by gap distance (x-axis), in Torr·cm. The skilled person would appreciate that the curve shape would be the same for Pascal·metres (Pa·m), with appropriate scaling of the values listed on the axis. A change in gaseous composition of the atmosphere with altitude may also affect electrical breakdown voltage.

As an aircraft 1 ascends, the electrical breakdown voltage decreases. In known aircraft, a constant operating voltage is used. To avoid arcing or the like, insulation and/or air gaps between equipment are, in the prior art, configured for the worst case scenario (high voltage at high altitude). The aircraft is therefore over-rated at lower altitude, carrying more weight and/or being bulkier than it needs to be, or, from an alternative perspective, operating at a lower voltage than it could. The inventor appreciated that the voltage could instead be dynamically varied—lowered at higher altitudes—to accommodate the varying breakdown voltage without requiring the same extent of over-rating at lower altitudes.

A method 400 of operating an aircraft electrical power distribution system is therefore provided.

The method 400 comprises determining 402 a measure of ambient pressure. The measure may be a pressure measurement such as a direct measurement of ambient pressure (i.e. the pressure outside of the aircraft 1), or may be a measure of a pressure within the aircraft, at a location within the aircraft in which pressure is expected to vary with ambient pressure (or monitored to check for fault-induced variation with ambient pressure), even if not to be equal to ambient pressure. Alternatively, the measure may be an altitude measurement, noting that atmospheric pressure changes with altitude in a generally predictable manner (although there may be local variations, e.g. turbulence, at a given altitude). The method 400 further comprises setting 404 a target operating voltage for the aircraft electrical power distribution system in accordance with the measure of ambient pressure.

The method 400 further comprises controlling 406 the operating voltage in accordance with the set target operating voltage. A voltage regulator or the likes may perform step 406. The controlling 406 the operating voltage may comprise adjusting/regulating the operating voltage to be exactly equal to the target operating voltage, as close as possible to the target operating voltage, or within a set range (tolerance) of the target operating voltage.

For an electrical distribution system 600 operated within a pressurised area of an aircraft 1, the voltage may be generally set to a highest level for operation across all stages of the flight cycle (as pressure may not vary significantly across the flight cycle, even though altitude does). However, the method 400 described herein may find utility for such systems if a failure results in depressurisation of the area. In case of depressurisation, the system 600 may be arranged to reduce the operating voltage to within the capability of the insulation system of the electrical distribution system 600 at the new ambient pressure. As used herein, the term "insulation system" refers to any number of different insulation methods and/or materials used to insulate the conductors in the electrical distribution system 600. In some implementations, this reduction of voltage may be accompanied by some electrical load management (e.g. load shedding) to ensure the distribution system conductors are not overloaded (i.e. that current does not increase to problematically high levels as the voltage decreases).

The method 400 is automated in the embodiments being described—the target operating voltage is adjusted 404 automatically in response to a change in the measure of ambient pressure, and the actual operating voltage for which the target has been set is then controlled/regulated 406 as appropriate. The method 400 may operate continuously, and/or at intervals. For example, a measure of ambient pressure may be obtained at regular time intervals, e.g. every second, every 30 seconds, every minute, every five minutes, every ten minutes, or the like. Additionally or alternatively, a measure of ambient pressure may be obtained at varying time intervals depending on stage of flight—for example frequently during climb and descent, and less frequently during cruise. Additionally or alternatively, a measure of ambient pressure may be obtained in response to a stimulus such as an altimeter noting altitude reaching or passing a set value, or the use of particular cockpit controls. Data from avionic sensors (e.g. an angle-of-attack sensor) may therefore be used to trigger actions and/or confirm pressure sensor readings. Similarly, a voltage regulator or the likes may continually adjust the actual operating voltage—optionally at a higher frequency than the updates to the target value.

The method 400 may be implemented using the aircraft 1 of FIGS. 1 and 2.

Figure 5:
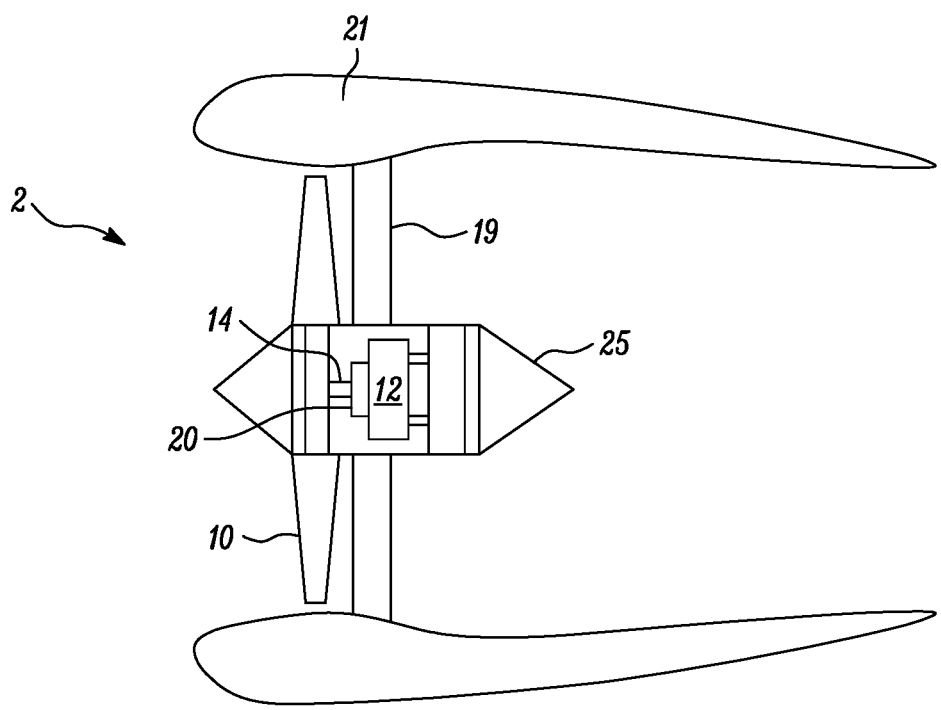
FIG. 5 is a schematic sectional view of a propulsion system as shown in FIG. 1.

The propulsion system 2 of the aircraft 1 of the illustrated embodiment is shown in further detail in FIG. 5. In this embodiment, two propulsion systems 2 are provided, each comprising a ducted fan 10, mounted on a wing of the aircraft 1, within a nacelle 21. The driven fans 10 may be referred to as propulsors. Each fan 10 is enclosed within a respective fan duct 21, and is mounted to a core nacelle 25. The fans 10 of the embodiment shown in FIG. 5 are driven by an electric machine 12 via a drive shaft 14. The electric machine 12 and drive shaft 14 may also be thought of as components of the respective propulsor. The electric machine 12 is supplied with electric power from a power source. In the present embodiment, the power source comprises a gas turbine engine 4, which drives a generator 32. An additional or alternative power source in the form of one or more chemical batteries 8 is also provided in some embodiments. In alternative embodiments, only a single power source may be present, or a separate power source may be provided for each fan 10. In still further embodiments, different power sources, e.g. fuel cells and/or nuclear power, may be used instead of, or as well as, the gas turbine engine 4 or chemical batteries 8.

In other embodiments, the first and second propulsors may comprise first and second open rotors rather than ducted fans 10. In such cases the fan duct 21 is absent.

The core nacelle 25 is coupled to the fan duct 21 by a plurality of struts in the form of outlet guide vanes 19. Each of the fans 10 comprises a plurality of blades carried by a central hub. The central hub of each fan is coupled to the respective drive shaft 14 so that it can be driven by the electric machine 12. A gearbox 20 may be provided between the electric machine 12 and the drive shaft 14. In the described embodiment, the gearbox 20 is provided between the electric machine 12 and the fan 10 so that the drive shaft 14 can rotate at a different speed from the electric machine 12 to which it is coupled via the gearbox 20.

Figure 6:
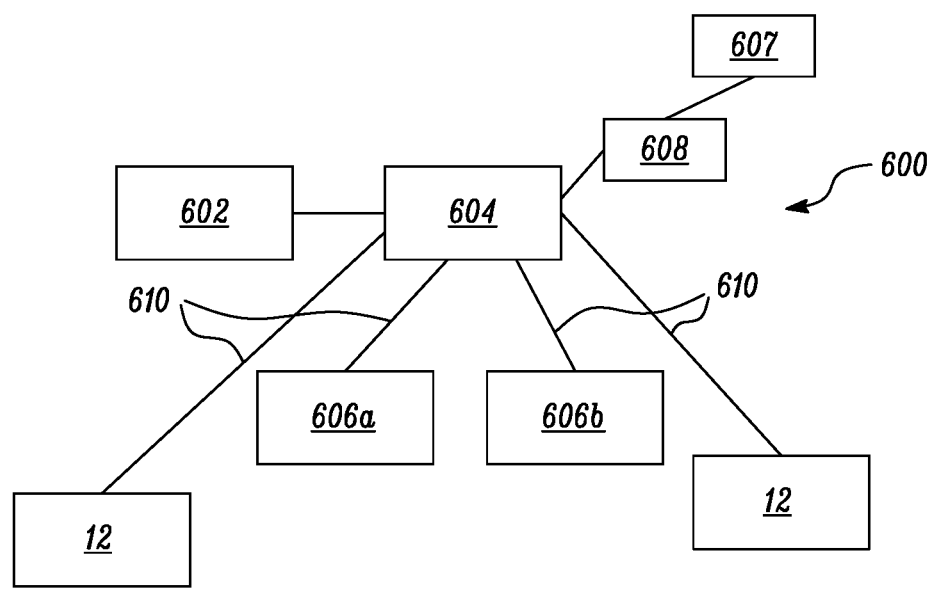
FIG. 6 is a schematic view of an aircraft electrical power distribution system.

The propulsion system 2 comprises an electrical power distribution system 600, as illustrated in FIG. 6. The electrical power distribution system 600 comprises, or is connected to, a power source 602. The power source 602 comprises the gas turbine engine 4 and generator 32 in the embodiment shown in FIG. 1, but may differ in other embodiments. The output of the power source 602 is regulated by a voltage regulator 604 so as to regulate the voltage of the output power. The voltage regulator 604 may be integral with the power source 602 in some embodiments. In various embodiments, more than one power source 602 (and generally therefore more than one voltage regulator 604) may be provided, for example to meet certification standards. The multiple power sources 602 may supply the distribution system 600 in parallel. The control of parallel electrical sourcing may be managed by a power sharing control scheme, such as Master/Slave (where one of the voltage regulators 604 'coordinates' the behaviour of all the voltage regulators 604) or Voltage Droop control (where the voltage regulation target is dictated by the load on the system 600—so for higher loads the system would operate with a lower voltage)—to those skilled in the art, the different means of achieving the above parallel regulation are well known.

In the case of voltage droop control, the target operating voltage as described herein may be selected to be, for example:

the no-load voltage for Voltage-droop (i.e. the max voltage); or another point on the droop characteristic that is chosen during system design to ensure that unloading of the system 600 does not result in electrical overstressing of the electrical insulation systems and/or exceeding component voltage ratings.

The or each voltage regulator 604 may include one or more step-up and/or step-down transformers in various embodiments. The or each voltage regulator 604 may include one or more Power Electronic Converters and/or rectifiers. The regulated output power is then transmitted to one or more of the electric machines 12, and/or to other system components 606 of the aircraft 1. For example, the electrical power may be used to power one or more auxiliary systems of the aircraft 1, e.g. lighting, heating, and/or Environmental Control Systems (ECS, generally arranged to provide pressurisation to cabins and cooling to equipment), and/or may be used to power components of the propulsion system 2 (e.g. a fuel pump for the gas turbine engine 4, or a heater arranged to maintain the chemical batteries 8 at a suitable temperature at high altitude or in cold ground conditions, or a cooling system for propulsion system components). One or more wires, cables or the like 610 may be used to transmit the power, so forming one or more circuits for power distribution.

The electrical power distribution system 600 further comprises a sensor 607. The sensor 607 may be provided specifically for the electrical power distribution system 600, or an already-present sensor 607 of the aircraft 1 may be used to provide a measurement to the electrical power distribution system 600. The sensor 607 may be an ambient pressure sensor (arranged to provide a measure of a local pressure outside of the aircraft), an aircraft pressure sensor (arranged to provide a measure of a pressure in a known location within the aircraft), or an altitude sensor (an altimeter—arranged to provide a measure of the current altitude of the aircraft), or a combination of two or more of the three. The sensor 607 may comprise multiple sensors, of the same or different types, for example such that cross-checking may be performed automatically.

The electrical power distribution system 600 further comprises a controller 608 (e.g. control circuitry or control software operating on general hardware). The controller 608 is arranged to set a target value for the operating voltage based on the value provided by the sensor 607, and to cause the (or each) voltage regulator 604 to adjust the output voltage as appropriate (e.g. by providing the set target value to the regulator 604). The operating voltage is thereby decreased by a suitable amount as altitude increases/pressure decreases. The controller 608 may be provided by a flight control computer already present in the aircraft 1 and/or already present in the propulsion system 2 (e.g. a gas turbine Electronic Engine Controller (EEC) may be adapted to act as the described controller 608, amongst other functions)—extant hardware may therefore be programmed to perform the role of determining the required target operating voltage and causing the voltage regulator(s) 604 to regulate the voltage accordingly. In alternative embodiments, dedicated hardware may be provided for the controller 608, optionally integral with a dedicated sensor 607. The controller 608 is arranged to automatically and dynamically change the target output voltage from the voltage regulator 604, which is conditioning power from power source 602, in response to changes in the value provided by the sensor 607. In response to the changing output from the controller 608, the voltage regulator 604 adjusts the voltage towards the target value.

In the embodiment being described, the target operating voltage is a target distribution voltage—the voltage of the output power from the power source 602 is adjusted (this may also be referred to as being conditioned, converted, and/or regulated) to match the target operating voltage for the distribution system 600. The distribution voltage is therefore regulated. In other embodiments, the target operating voltage may refer to a different voltage of the system 600, for example the voltage required at a Point of Regulation (PoR). As is known in the art, a PoR refers to any point in the electrical system where the electrical power quality is required by regulations to meet specific requirements or standards. The voltage regulator 604 may be differently located in some such embodiments.

As discussed above, embodiments may be implemented using standard aircraft components—e.g. an extant flight computer, sensor, and power source 602. The voltage regulator 604 may be added, or an extant voltage regulator reprogrammed or replaced with one more suited to dynamic adjustment of output voltage. No, or minimal, additional mass or components may therefore be required to implement various embodiments—they can instead be implemented using existing sensing, processing and control hardware.

In the illustrated embodiment, the power source 602 operates at a fixed voltage by design. The dynamic voltage adjustment therefore only applies to electrical distribution within the aircraft 1—the power source 602 itself may remain over-rated at lower altitudes as the insulation is arranged to provide adequate protection for the constant voltage under the lowest breakdown voltage conditions expected. Power sources 602 are often restricted to operate at a particular voltage or set of voltages, e.g. by cell voltage limiting that from a battery, or back-e.m.f. limiting that from a generator or the like, hence various embodiments focus on dynamically controlling a target operating voltage for a different part of the system 600, e.g. for distribution only, rather than at the point of generation.

In alternative embodiments, a power source 602 capable of variable voltage generation/output may be used. The generation may therefore be dynamically adjusted according to pressure/altitude instead of stepping up or down an output for distribution. Such a power source 602 may have an increased mass, considering current technologies, so a trade-off between functional gain and increased weight may need to be considered, and operation at the maximum altitude design point checked. In such embodiments, the controller 608 may control the power source 602 instead of, or as well as, a voltage regulator 604 arranged to regulate the output from the power source 602.

In various embodiments, the controller 608 is arranged to adjust the target voltage in different ways, and the regulator 604 is arranged to regulate the voltage for which the target is set in line with the target. The voltage adjusted by the controller is the target operating voltage for electrical distribution on the aircraft 1 in the embodiments being described—the desired voltage output from the voltage regulator 604. In reality, the actual distribution voltage may fluctuate around this set level. For AC electrical distribution, the target operating voltage may be provided as an r.m.s. voltage value.

The skilled person would appreciate that a hybrid aircraft propulsion system typically operates at several different voltages for different portions of the system:

Where a generator 32 is used, energy is generated by the generator at a first voltage (the generation voltage).

The generation voltage may be adjusted—for example stepped-up to a higher voltage, and converted to DC (which may be performed by a single device, or by multiple separate devices)—for distribution about the aircraft 1—distribution being at a second voltage (the distribution voltage).

The distributed voltage may be adjusted—for example stepped-down—for use by a load/consumer (e.g. by a motor 28 (FIG. 10) or other electric machine 12 (FIG. 5)).

Similarly, for an electric aircraft powered by one or more batteries alone, the individual cell voltage may generally be relatively low (of the order of a few volts), and the output voltage may be increased by connecting cells in series.

In different implementations, different system voltages may be selected as the operating voltage for which a target is set and which is then regulated. For example, any of the voltages listed above may be selected as the operating voltage—i.e. the operating voltage may be the generation voltage, the distribution voltage, or a voltage regulated for a specific load/consumer. Embodiments disclosed herein may have particular utility for higher power systems in an aircraft 1 (and particularly for distribution systems operating above Paschen's minima, of ~327 Vdc), provided that there is sufficient voltage controllability to enable a variable voltage (not all machine topologies of all aircraft may enable a variable generator voltage, for example).

For machines with a controlled excitation (to vary generator back EMF) the variation in back EMF may be performed in conjunction with control of a voltage regulator (e.g. AC/DC converter) to achieve a desired distribution voltage.

The highest voltage may often be selected as this is the voltage most susceptible to arcing for a given gap size. In many examples, the highest system voltage is the distribution voltage and the target operating voltage may therefore be a target value for the distribution voltage. The distribution voltage is therefore the voltage to be controlled as described in such embodiments.

In other examples, a different voltage may be more critical—for example an operating voltage for the electric machine with the smallest gap size. The distribution voltage may be controlled so as to provide a suitable supply voltage for the electric machine, and/or a separate controller may be provided for the electric machine.

The skilled person would appreciate that the sizing of insulation of system components should be considered for components that are expected to have a variable voltage. The current rating and the insulation rating of the hardware may be considered.

Current rating of hardware may be performed in various ways, including the below options:

sizing hardware for a maximum power point with a nominal/'default' voltage (generally a higher voltage intended for use at lower altitude/higher pressure), so failure of the controller 608 (such that the system fails to the 'default' voltage) does not result in hazardous event—the controller 608 is not 'safety-critical' in such implementations; or allowing the controller 608 to be more 'safety critical', by sizing the current rating of equipment to deliver the maximum current point based on the intended variable voltage (if the voltage control fails in such implementations, the system will be 'overloaded' at some conditions, so load management is required for safety.)

Voltage rating of hardware may be performed in various ways, including the below options (which correspond closely to the two listed above for current rating):

designing the insulation to a 'default' voltage at maximum altitude (with additional design margin for electrical transients and safety)—as for the current rating option described above, failure of the controller may be arranged to default the system to a voltage that can deliver the required power across the flight envelope within the current carrying capacity of the distribution conductors and components. A greater overall weight and/or size of insulation is generally needed for this option as compared to the second option.

designing the insulation to be suitable for the maximum expected voltage at maximum altitude/lowest pressure, assuming that the intended reduction of voltage as altitude increases is implemented. This may require the controller 608 to be safety critical, as failure to correctly set the target operating voltage may over-voltage the insulation or components.

A side effect of allowing the voltage to be lowered at higher altitudes is that the system 600 generally must be designed to deliver all permissible power demands at the lower voltage—thereby requiring overrating in the current rating of hardware (as a higher current may be needed to supply the required power at a lower voltage), which may incur additional mass. In implementations in which the controller functionality is designed to be safety critical, the current rating of hardware could conceivably be designed precisely based on how voltage would vary, thereby optimising the mass of the electrical system (reducing overrating and therefore potentially reducing mass). For the same load, a reduction in distribution voltage with altitude generally corresponds to an increase in current—higher altitude operation may therefore be less efficient, but the life of the insulation system may be extended. The mass and/or volume of the insulation system may be reduced. The volume, or cross-sectional area, of the insulation may have the greatest impact on design/assembly/installation in some embodiments, as it influences bending radii of cables, and packing density of components.

Other than a change in control functionality, embodiments described herein may be performed using existing aircraft 1 and existing aircraft propulsion systems 2. One or more of the flowing steps may be taken to ensure compatibility of existing hardware with the implementation of a variable operating voltage as described herein, and/or when designing a new system:

Power sources 602 (e.g. a generator or stored energy devices such as batteries and/or supercapacitors) may be rated to generate the maximum voltage desired in operation. If a voltage regulator 604 is arranged to step the source voltage up or down, converter topology should be selected to be capable of delivering both extremes of operation.

Power Electronic Converters may be desired for delivering a variable distribution voltage (particularly for DC distribution systems). One or more such converters may therefore be added to a propulsion system, and/or the control hardware (and/or software) for extant converters may be adjusted as appropriate.

Electric machines 28 may be designed or adapted to deliver a back-EMF at a minimum generator speed. For a machine delivering higher back-EMF at low altitude, specific winding topologies may be selected to allow or facilitate this, which may affect the design of power electronic converter(s) used.

One or more transformers may be provided or adapted to step-up or step-down a regulated AC or DC voltage as appropriate (for DC systems, the transformer may be part of an isolated DC-DC converter topology). Transformers may also be used to provide galvanic isolation between two circuits, which can support fault management (by limiting fault current through a transformer, due to saturation of the magnetic field).

The skilled person would appreciate that the list of steps provided above is provided by way of example only; the list may not be exhaustive and not every step on the list may be required.

Figure 7:
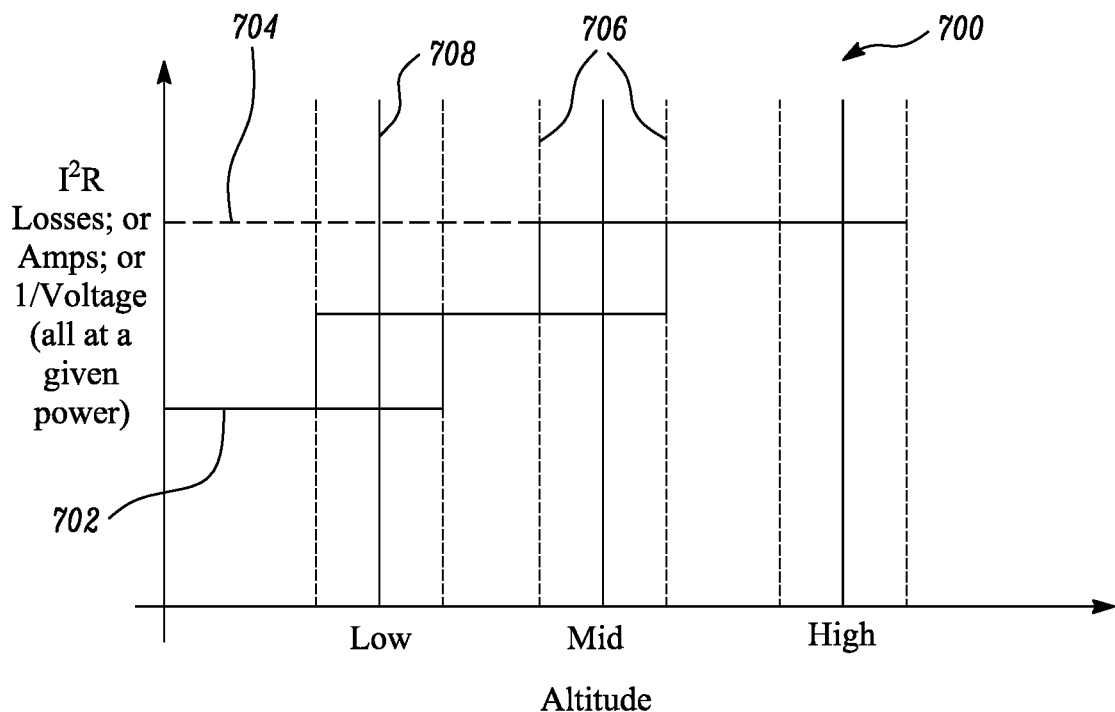
FIG. 7 is a graph of reciprocal voltage against altitude, illustrating a first control methodology for an aircraft electrical power distribution system.
Figure 8:
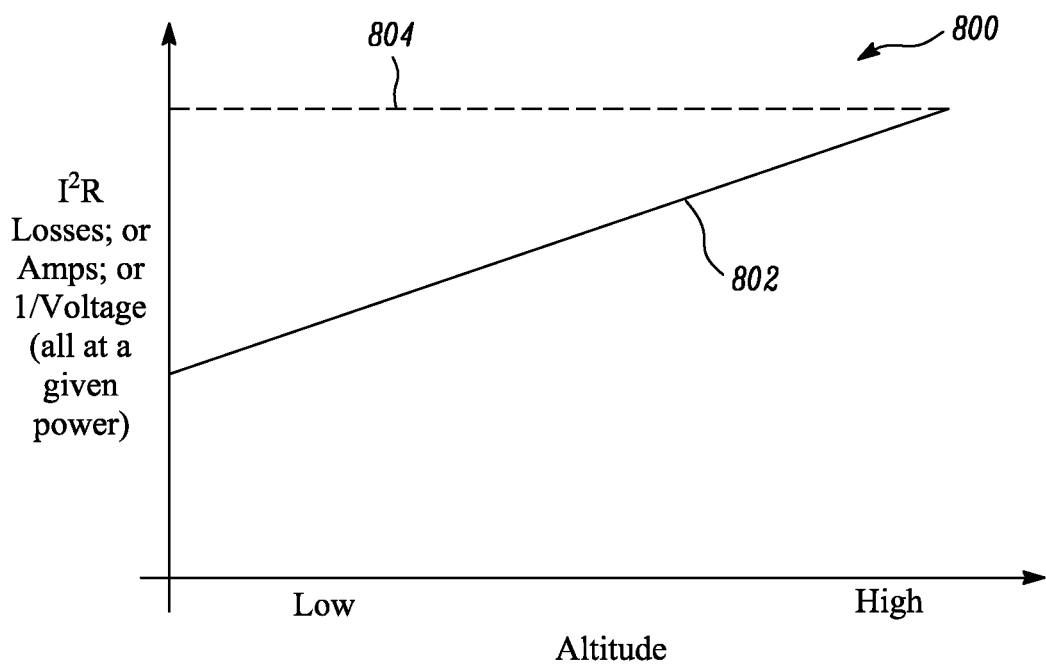
FIG. 8 is a graph of reciprocal voltage against altitude, illustrating an alternative control methodology for an aircraft electrical power distribution system.

FIGS. 7 and 8 illustrate two possible implementations of control of the selected operating voltage.

FIG. 7 provides a graph 700 of reciprocal voltage (1/V, on the y-axis) against altitude (on the x-axis) for a control method 400 of one embodiment. FIG. 7 may alternatively be seen as a graph 700 of current (on the y-axis) against altitude (on the x-axis) for a constant electrical power. The graph 700 may also be thought of as a graph of transmission power losses ($I^2R$, where I is current in Amps and R transmission resistance in Ohms, on the y-axis) against altitude (on the x-axis) for a constant electrical power. In summary, with increasing altitude, the voltage is expected to decrease (and therefore 1/V to increase), which means that for a given power the current (I) will increase and so too will the losses ($I^2R$).

The implementation illustrated in FIG. 7, shown by the solid line 702, uses a set of defined, discrete altitudes (shown by solid vertical lines 708) at which step changes in operation are made to a higher voltage (if decreasing altitude) or a lower voltage (if increasing altitude). Discrete pressures may be set instead of discrete altitudes—the skilled person will appreciate that the two are generally interchangeable for embodiments disclosed herein, although the direction of change is reversed. To avoid oscillation, hysteresis bands may be used in such embodiments, as shown. In FIG. 7, the vertical dotted lines 706 on each side of a solid vertical line 708 illustrate hysteresis bands (also known as switching boundaries) around the set pressures or altitudes. The altitude difference between the boundaries may prevent repeated voltage changes if the aircraft 1 is flying at an (approximately) constant altitude (approximately) equal to a discrete altitude of the set of defined, discrete altitudes 708 (and likewise for set pressures).

In the embodiment being described, should the controller 608 fail, the system 600 is set to default to a lower voltage (and therefore non-hazardous, or at least less-hazardous) condition, as illustrated by the dashed line 704. The dashed line 704 is constant with altitude and takes the lowest voltage value of the intended dynamic values. This failsafe position is a constant, relatively low, voltage, to ensure that the system 600 is safe from arcing at any relevant altitude/pressure. Failsafe conditions may differ, or may not be implemented, in other embodiments.

FIG. 8 provides a graph 800 of reciprocal voltage (1/V, on the y-axis) against altitude (on the x-axis) for a control method 400 of another embodiment.

The implementation illustrated in FIG. 8, illustrated by the solid line 802, continuously varies the operating voltage with altitude. The continuous change with altitude/ambient pressure may only be implemented within a flight envelope—i.e. there may be a set minimum voltage which the system 600 does not go below even if altitude increases beyond the expected maximum altitude, and a set maximum voltage which the system 600 does not go above even if the altitude decreases below the expected minimum altitude. Compared to the embodiment described with respect to FIG. 7, there may be greater computational demand for this continuous control approach, but there are no significant transient points/steps, which may provide smoother operation. In alternative implementations, the solid line 802 may be non-linear, for example to reflect a greater rate-of-change in pressure at lower altitudes, compared with the slower rate-of-change in pressure at higher altitudes. The control methodology as indicated by the solid line 802 may also be customised to optimise the operational voltage to the variation in pressure expected within an enclosed space in an aircraft structure. The skilled person will appreciate the design trades required to define the linear or non-linear relationship according to which the voltage should be varied with altitude or pressure in various embodiments.

In the implementation being described with respect to FIG. 8, should the controller 608 fail, the system 600 is again set to default to a lower voltage (and therefore non-hazardous, or at least less-hazardous) condition, as illustrated by the dashed line 804. The dashed line 804 is constant with altitude and takes the lowest voltage value of the intended dynamic values. This failsafe position is a constant, relatively low, voltage, to ensure that the system 600 is safe from arcing at any relevant altitude/pressure. Failsafe conditions may differ, or may not be implemented, in other embodiments.

In various embodiments, the fail-safe operating condition 704, 804 may be the original voltage design intent of the aircraft 1, and may therefore be prima facie operable across the entire defined flight envelope without any changes to component insulation ratings. In such embodiments, implementing the control procedure 400 described herein may simply provide a performance/efficiency enhancement without changing or reducing the weight of a system design. Identical components may be used with a new control approach implemented. Operating at a higher voltage than used previously at lower altitudes may reduce transmission losses and improve performance at the lower altitudes, whilst using the same voltage at the highest altitude retains the same performance.

In most embodiments, the lowest voltage setting is equal to, or higher than, voltages used in equivalent prior aircraft—such previously-used voltages being below Paschen's minima, as they are selected to avoid the risk of arcing by avoiding any permissible combination of voltage and gap distance that can exceed the breakdown voltage. In other embodiments, the lowest voltage/highest altitude setting may be a lower voltage than that used in prior aircraft. A reduction in performance at the highest altitudes—at which altitude operation may be rare or only for a small proportion of a flight length—may be accepted in exchange for a weight and/or space saving and improved or equivalent performance at lower altitudes. The fail-safe operating condition 704, 804 may be lower than the original voltage design intent of the aircraft 1 in such embodiments.

The skilled person would appreciate that the various embodiments may be implemented in combination with any suitable power sharing scheme (e.g. Master/Slave, Voltage Droop, etc., as briefly described above). Further, various embodiments may be implemented in both AC and DC distribution systems.

The embodiments described above have a fully electric propulsion system 2 for at least one propulsor—different propulsors on the same aircraft 1 may be driven in a different way and the propulsion system 2 may therefore form part of an electric aircraft or a hybrid aircraft.

Figure 9:
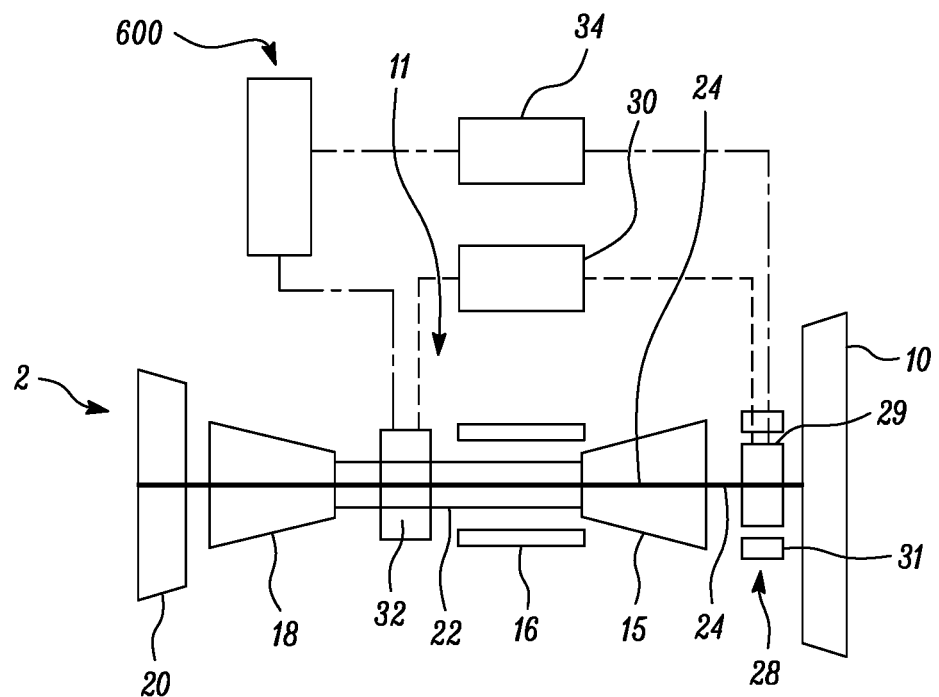
FIG. 9 is a schematic sectional view of an aircraft propulsion system different from that shown in FIG. 5.
Figure 10:
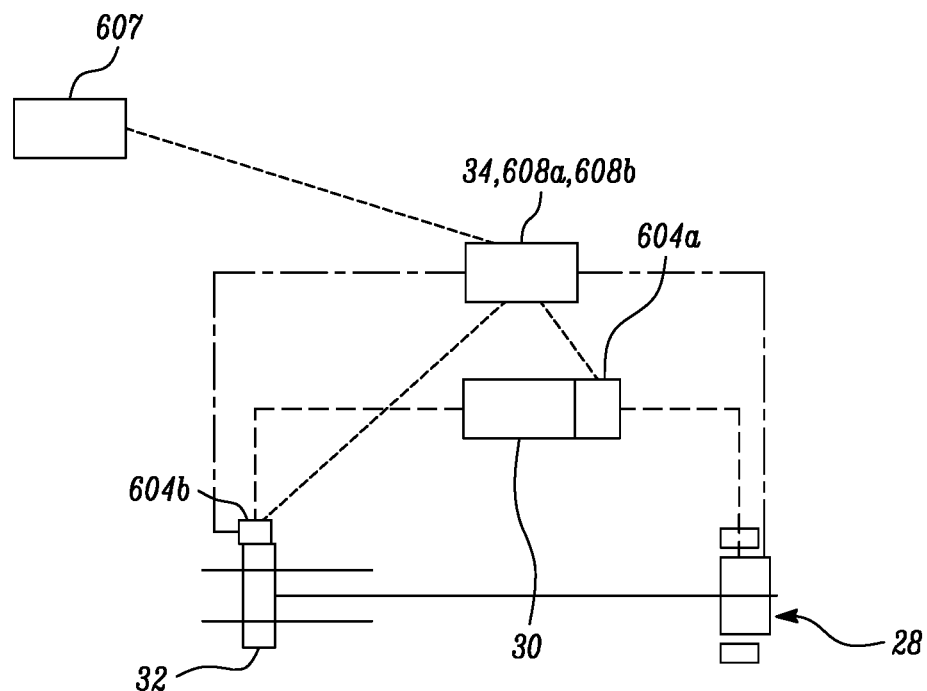
FIG. 10 is a schematic plan view of an aircraft electrical power distribution system for use with the propulsion system of FIG. 9.

An alternative arrangement for a hybrid propulsion system 2 is now described with respect to FIGS. 9 and 10. The skilled person would appreciate that the electrical power distribution system 600 may operate as described above.

FIG. 9 shows the propulsion system 2 of this embodiment schematically. The propulsion system 2 includes an internal combustion engine in the form of a gas turbine engine 11. The gas turbine engine 11 comprises, in axial flow series, a propulsor (comprising a fan/propeller 10), a compressor 15, combustion equipment 16, and high and low-pressure turbines 18, 20.

The gas turbine engine 11 works in the conventional manner so that air is accelerated by the fan 10 to produce two air flows: a first core air flow into the compressor 15 and a second air flow which bypasses the compressor 15 to provide propulsive thrust. The core air flows through the compressor 15 where it is compressed, before delivering that air to the combustion equipment 16, where it is mixed with fuel and the mixture combusted. The resultant hot combustion products then expand through, and thereby drive, the turbines 18, 20 before being exhausted through a nozzle to provide additional propulsive thrust. The high and low-pressure turbines 18, 20 drive respectively the compressor 15 and fan 10, each by suitable interconnecting shaft 22, 24.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 2 further comprises one or more electrical machines driving one or more propulsors. In particular, the system 2 comprises an electric motor 28. The motor 28 is of a conventional type, such as an induction or permanent magnet electric machine, and is configured to assist the gas turbine engine 11 in driving a propulsor (e.g. comprising the fan 10). In the embodiment being described, the majority of the propulsive effort is provided by the gas turbine engine 11, with the motor 28 being arranged to provide assistive torque (motoring). In other embodiments of hybrid propulsion systems, the balance may differ—e.g. the electric machine(s) may provide as much of the propulsive effort as the gas turbine engine 11, or more. In pure electric aircraft, the electric machine(s) provide all of the propulsive effort, whereas in some MEA embodiments, the electric machine(s) may provide none of the propulsive effort.

In other embodiments, an electrical machine present may be a motor/generator 28, capable of providing both assistive torque (motoring) and braking torque (generating). In such embodiments, the electric machine 28 may also include an energy storage device, e.g. a battery or capacitor.

In the present embodiment, the motor 28 is coupled to the fan 10 via the low-pressure shaft 24. In this embodiment, the electric motor 28 is of a "core shaft mounted" type, in which a rotor 29 of the motor 28 is mounted directly to a surface of the low-pressure shaft 24, and is surrounded by a stator 31, provided radially outwardly of the rotor 29. Other configurations may be used in other embodiments. The stator comprises electrical windings (not shown), which can be energised to produce a rotating magnetic field. This rotating magnetic field interacts with a magnetic field of the rotor 29, to cause rotation when acting as a motor. Consequently, the fan 10 may be powered by either or both of the gas turbine engine 11 via the low-pressure turbine 20, and the motor 28.

The skilled person will appreciate that any suitable machine topology could be implemented to fit within space constraints of the gas turbine engine. Furthermore, in embodiments in which there is insufficient space for an electrical machine to be 'core shaft mounted' mechanical power may be transmitted to or from an externally mounted electrical machine, for example by a radial drive shaft. The control of the distribution voltage as described herein may be implemented for any suitable system.

The electric motor 28 is coupled to an energy storage device 30 in the form of one or more of a chemical battery, fuel cell, and capacitor, which provides the electric motor 28 with electrical power during operation. In some cases, multiple energy storages systems, which may be of different types (chemical battery, fuel cell, etc.) may be provided for each propulsion system 2. In other cases, a common energy storage device 30 may be provided for multiple propulsion systems.

A controller 34 is provided, which is configured to control at least the motor 28 and energy storage device 30, to control the torque provided by the motor 28, and the charging/discharging of the energy storage device 30. The motor 28 is connected to the low-pressure shaft 24 in the embodiment shown in FIG. 9.

In various embodiments, the propulsion system 2 further comprises an electrical machine 32, which is coupled to one or both of the motor 28 and the energy storage device 30. The electrical machine 32 may be a generator 32 such that additional electrical energy can be provided in operation. For example, the electrical machine 32 may be a motor/generator or starter/generator, which may be capable of providing torque to start the gas turbine, and/or to motor the shaft during operation, as well as to generate electricity when the extra torque contribution is not desired. The generator 32 is driven by the high-pressure shaft 22 of the gas turbine engine in the embodiment shown in FIG. 9. The generator 32 may be coupled to the shaft 22 via a gearbox and/or clutch to allow for selectively connecting and disconnecting the generator 32 from the shaft 22. In some cases, the motor 28 may act as a generator. In such embodiments, the controller 34 may also be configured to control operation of the generator 32, 28, to control electrical power produced by the generator 32, 28. The skilled person would appreciate that the embodiment shown in FIG. 9 is provided by way of example only, and that component locations may vary in other embodiments. For example, in the embodiment shown in FIG. 9, the generator 32 is near, and downstream of, the combustion equipment 16, whereas in other embodiments the generator 32 may be located further from, and/or upstream of, the combustion equipment. The skilled person will appreciate that the axial locations of the electrical machines may be selected as part of a design trade that may be influenced by many factors (e.g. operating conditions, electrical conductor access, bearing locations, etc.), and that the specific example shown is not intended to be limiting.

In the embodiments being described with respect to FIGS. 9 and 10, an electrical power distribution system 600 is provided. The controller 34 may form a part of, or be connected to, the electrical distribution system 600. The electrical power distribution system 600 comprises one or more voltage regulators 604a, 604b, each arranged to regulate the voltage of the power output from the power source 30, 32 (and 28 in embodiments in which the electric motor 28 is also capable of being used for generation). For example, one voltage regulator 604a may be provided for the energy storage device 30 and a second voltage regulator 604b may be provided for the generator 32 (in embodiments in which a generator 32 is provided). The skilled person would appreciate that the figures are representative only—in particular, the electrical power distribution system 600 is generally not provided as a single box, but rather may include components at different points around one or more distribution circuits, as indicated by the regulators 604a, 604b shown in FIG. 10 but omitted in FIG. 9 for simplicity. The connections shown in dashed and dot-dashed lines may also be thought of as a part of the electrical power distribution system 600 in some embodiments.

The electrical power distribution system 600 comprises one or more controllers 608a, 608b arranged to control the voltage regulator(s) 604a, 604b so as to adjust an operating voltage to a target value determined by the controllers 608a, 608b in accordance with the measure of ambient pressure. For example, one controller 608a may control the output voltage of the voltage regulator 604a for the energy storage device 30, and a second controller 608b may control the output voltage of the voltage regulator 604b for the generator 32 (in embodiments in which a generator 32 is provided). A single controller 608 may control multiple regulators 604 in some embodiments. The controller 34 may provide either or both of the controllers 604a, 604b arranged to set the target operating voltage.

A measure of ambient pressure is provided to the controller(s) 604 from sensor 607.

Sensor 607 is provided to determine a measure of ambient pressure for use by the controller(s) 604. The sensor 607 may be provided specifically for the electrical power distribution system 600, or use may be made of a sensor 607 already present elsewhere in the propulsion system 2, or elsewhere in an aircraft 1 arranged to use the propulsion system 2 (e.g. to which the propulsion system 2 is attached).

The electrical power distribution system 600 shown in FIG. 10 may therefore operate in an equivalent manner to that described above with respect to FIGS. 6 to 8.

The skilled person will appreciate that many different propulsion systems 2 may be provided with an electrical power distribution system 600 operating on the principles disclosed herein, and that the illustrated embodiments are provided by way of non-limiting example only.

It will be understood that the invention is not limited to the embodiments above-described and that various modifications and improvements can be made without departing from the concepts described herein. Except where mutually exclusive, any of the features may be employed separately or in combination with any other features and the disclosure extends to and includes all combinations and sub-combinations of one or more features described herein.

For example, various implementations of the approach to voltage regulation disclosed herein may be used to offer additional functionality or benefits.

For example, variation of the distribution voltage could be used to respond (reactively) to a measurable deterioration in an insulation system. In such embodiments, the insulation system can be monitored using any suitable standard Insulation Monitoring Device, which could be configured to monitor insulation whilst the power distribution system 600 is operating, and/or when the power distribution system 600 is not energised. Variation of the distribution voltage could be used to proactively manage health of the insulation system (for example the effects of age)—for example, the target operating voltage may be reduced to allow for estimated insulation deterioration. This could be configured based on a design parameter, or characteristic varying with time, that reflects the anticipated deterioration of insulation with time. Accuracy of the assumed insulation health could be periodically checked by stand-alone insulation checking equipment to 're-align' the insulation estimation.

The invention claimed is:

1. A method of operating an aircraft electrical power distribution system having an operating voltage, the method comprising:
    determining a measure of ambient pressure;
    setting, by a controller, a target operating voltage of the aircraft electrical power distribution system in accordance with the measure of ambient pressure; and
    controlling the operating voltage in accordance with the set target operating voltage wherein the setting a target operating voltage in accordance with the measure of ambient pressure comprises:
        (i) pre-defining a plurality of set pressure levels;
        (ii) stepping down the target voltage, by the controller, to a pre-set voltage level of a plurality of pre-set voltage levels if the measure of ambient pressure decreases past a value corresponding to one of the set pressure levels; and
        (ii) stepping up the target voltage, by the controller, to the pre-set voltage level of a plurality of pre-set voltage levels if the measure of ambient pressure increases past a value corresponding to the one of the set pressure levels,
    wherein the controller is configured to operate according to defined hysteresis bands around the set pressure levels,
    wherein stepping down the target voltage is performed by the controller when the measure of ambient pressure reaches a first hysteresis band of the hysteresis bands that is below the one of the set pressure levels, and
    wherein stepping up the target voltage is performed by the controller when the measure of ambient pressure reaches a second hysteresis band of the hysteresis bands that is above the one of the set pressure levels.

2. The method of claim 1, wherein the measure of ambient pressure is at least one of:
    (i) an altitude value obtained from an altimeter; and
    (ii) a pressure value obtained from a pressure sensor.

3. The method of claim 1, wherein the controlling the operating voltage comprises one or more of:
    (i) controlling a power source so as to provide power at the target operating voltage; and
    (ii) controlling a voltage regulator so as to step up or step down the voltage to the target operating voltage.

4. The method of claim 1, further comprising distributing power to one or more electrical consumers on the aircraft, the distributed power being controlled to have a voltage at or near the target operating voltage.

5. The method of claim 3, wherein the power source comprises:
    (i) a chemical battery; or
    (ii) a gas turbine engine and an electrical generator arranged to be driven by the gas turbine engine.

6. The method of claim 3,
    wherein the power source is a first power source of a plurality of power sources,
    wherein the voltage regulator is a first voltage regulator of a plurality of voltage regulators and is associated with the first power source,
    the method further comprising managing the plurality voltage regulators according to a power sharing control scheme.

7. The method of claim 1, wherein the hysteresis bands are configured to avoid oscillation in the target voltage when the measure of ambient pressure is near a set pressure level of the plurality of set pressure levels.

8. The method of claim 1,
    wherein the measure of ambient pressure is based on an altitude value obtained from an altimeter;
    wherein the plurality of set pressure levels is based on a plurality of pre-defined set altitude levels
    wherein the hysteresis bands are defined around the set altitude levels, and
    wherein stepping down of the target voltage is performed by the controller when the measure of altitude reaches a first altitude hysteresis band that is above one of the set altitude levels, and
    wherein stepping up of the target voltage is performed by the controller when the measure of altitude reaches a second altitude hysteresis band that is below the one of the set altitude levels.

9. A propulsion system for an aircraft, comprising:
    a fan comprising a plurality of fan blades;
    a power source for supplying power to drive the fan, wherein the fan is arranged to receive an input from the power source to drive to the fan; and
    an electrical power distribution system having an operating voltage and comprising:
        a sensor configured to determine a measure of ambient pressure;
        a controller configured to set a target operating voltage of the aircraft electrical power distribution system in accordance with the measure of ambient pressure; and
        a voltage regulator configured to regulate the operating voltage of the electrical power distribution system in accordance with the set target operating voltage,
    wherein to set the target operating voltage comprises:
        (i) pre-defining a plurality of set pressure levels;
        (ii) step down the target voltage to a pre-set voltage level of a plurality of pre-set voltage levels if the measure of ambient pressure decreases past a value corresponding to one of the set pressure levels; and
        (ii) step up the target voltage to the pre-set voltage level of a plurality of pre-set voltage levels if the measure of ambient pressure increases past a value corresponding to the one of the set pressure levels,
    wherein the controller is configured to operate according to defined hysteresis bands around the set pressure levels,
    wherein the controller is configured to step down the target voltage when the measure of ambient pressure reaches a first hysteresis band of the hysteresis bands that is below the one of the set pressure levels, and
    wherein the controller is configured to step up the target voltage when the measure of ambient pressure reaches a second hysteresis band of the hysteresis bands that is above the one of the set pressure levels.

10. The propulsion system of claim 9, wherein the propulsion system further comprises an electrical motor configured to drive the fan via a gearbox, wherein the electrical power distribution system is configured to supply electrical energy from the power source to the electrical motor.

11. The propulsion system of claim 9, wherein the voltage regulator is configured to regulate the power output from the power source, such that the regulated operating voltage is a regulated distribution voltage for the electrical power distribution system.

12. The propulsion system of claim 9, wherein the power source comprises:
   (i) a chemical battery; or
   (ii) a gas turbine engine and an electrical generator arranged to be driven by the gas turbine engine.

13. An aircraft comprising the propulsion system of claim 9.

14. An aircraft electrical power distribution system comprising:
   a sensor configured to determine a measure of ambient pressure;
   a controller configured to set a target operating voltage of the aircraft electrical power distribution system in accordance with the measure of ambient pressure; and
   a voltage regulator configured to regulate the operating voltage of the electrical power distribution system in accordance with the set target operating voltage,
   wherein, to set the target operating voltage, the controller is configured to:
      (i) continuously decrease the target operating voltage when the measure of ambient pressure is decreasing;
      (ii) continuously increase the target operating voltage when the measure of ambient pressure is increasing; and
      (iii) maintain the target operating voltage at a constant level when the measure ambient pressure is constant.

15. The aircraft electrical power distribution system of claim 14, wherein the voltage regulator is configured to regulate power output from a power source.

16. The aircraft electrical power distribution system of claim 15, wherein:
   the power source is a first power source of a plurality of power sources,
   the voltage regulator is a first voltage regulator of a plurality of voltage regulators and is associated with the first power source, and
   the controller is configured to manage the plurality voltage regulators according to a power sharing control scheme.

17. The aircraft electrical power distribution system of claim 15, wherein the power source comprises:
   (i) a chemical battery; or
   (ii) a gas turbine engine and an electrical generator arranged to be driven by the gas turbine engine.

18. The aircraft electrical power distribution system of claim 15, wherein the power source is arranged to supply electrical energy to drive a propulsor of an aircraft.

19. An aircraft comprising the aircraft electrical power distribution system of claim 14.

* * * * *